(12) United States Patent
Beaver et al.

(10) Patent No.: US 10,662,381 B2
(45) Date of Patent: May 26, 2020

(54) DEVICE AND PROCESS FOR THE RECOVERY OF INCREASED VOLUMES OF PURE TERPENES AND TERPENOIDS FROM SCRAP POLYMERS AND ELASTOMERS

(71) Applicants: Earl R. Beaver, Chesterfield, MO (US); Jonathan L. Wistrom, Maryville, MO (US)

(72) Inventors: Earl R. Beaver, Chesterfield, MO (US); Jonathan L. Wistrom, Maryville, MO (US)

(*) Notice: Subject to any disclaimer, the term of this patent is extended or adjusted under 35 U.S.C. 154(b) by 294 days.

(21) Appl. No.: 15/219,128

(22) Filed: Jul. 25, 2016

(65) Prior Publication Data

US 2018/0023005 A1 Jan. 25, 2018
US 2020/0040261 A9 Feb. 6, 2020

Related U.S. Application Data

(63) Continuation-in-part of application No. 13/860,524, filed on Apr. 10, 2013, now abandoned.

(51) Int. Cl.

| | | |
|---|---|---|
| *C10B 1/02* | (2006.01) | |
| *C10B 1/06* | (2006.01) | |
| *C10B 47/02* | (2006.01) | |
| *C10B 47/44* | (2006.01) | |
| *C10B 53/07* | (2006.01) | |
| *C10G 1/02* | (2006.01) | |
| *C10G 1/10* | (2006.01) | |
| *B01D 3/14* | (2006.01) | |
| *B01D 1/22* | (2006.01) | |
| *C10B 7/10* | (2006.01) | |
| *C10B 27/06* | (2006.01) | |
| *C10B 57/06* | (2006.01) | |
| *C10G 1/00* | (2006.01) | |

(52) U.S. Cl.
CPC .............. *C10G 1/02* (2013.01); *B01D 1/22* (2013.01); *B01D 1/225* (2013.01); *B01D 3/143* (2013.01); *C10B 1/02* (2013.01); *C10B 7/10* (2013.01); *C10B 27/06* (2013.01); *C10B 47/44* (2013.01); *C10B 53/07* (2013.01); *C10B 57/06* (2013.01); *C10G 1/002* (2013.01); *C10G 1/10* (2013.01); *C10B 1/06* (2013.01); *Y02P 20/143* (2015.11)

(58) Field of Classification Search
CPC .......... C10G 1/08; C10G 11/02; C10G 11/10; C10G 11/12; C10G 11/14; C10G 11/16; C10G 15/08; C10G 1/02; C10G 2/35; C10G 1/10; B01J 19/123; C10B 53/07; C10B 47/44; C10B 47/02; B01D 3/143
USPC ........................................... 422/186.3
See application file for complete search history.

(56) References Cited

U.S. PATENT DOCUMENTS

| | | | | |
|---|---|---|---|---|
| 5,770,017 A | * | 6/1998 | Brown | B01J 19/243 201/25 |
| 10,131,847 B2 | * | 11/2018 | McNamara | C10B 47/18 |
| 2012/0076703 A1 | * | 3/2012 | Stiller | C10B 43/14 422/187 |
| 2012/0261247 A1 | * | 10/2012 | McNamara | C10B 47/18 201/25 |
| 2014/0305786 A1 | * | 10/2014 | Beaver | C10B 53/07 202/110 |

* cited by examiner

*Primary Examiner* — Jonathan Luke Pilcher
(74) *Attorney, Agent, or Firm* — Douglas E. Warren (57) ABSTRACT

A device and process for the vacuum pyrolization of scrap tires to produce a pyrolytic oil from which valuable terpenes such as limonene and pulegone may be extracted and purified.

11 Claims, 5 Drawing Sheets

DEVICE AND PROCESS FOR THE RECOVERY OF INCREASED VOLUMES OF PURE TERPENES AND TERPENOIDS FROM SCRAP POLYMERS AND ELASTOMERS

CROSS REFERENCE TO RELATED APPLICATIONS

This is a continuation-in-part of U.S. Non-provisional patent application Ser. No. 13/860,524 filed on Apr. 10, 2013 and the entire contents of that application are hereby incorporated by reference as if fully stated herein.

STATEMENT REGARDING FEDERALLY SPONSORED RESEARCH

Not Applicable.

BACKGROUND OF THE INVENTION

The continuing accumulation of used tires is one of the worst solid waste problems facing industrialized countries. It is estimated that North America discards approximately one used tire per person per year. The incineration of tires is both costly and complex, while stockpiling used tires is the subject of growing concern. Moreover, the possibility of tire fires on these sites poses an ever-increasing threat to the environment. On the other hand, tires represent a source of energy and chemicals. By thermal decomposition, it is possible to recover useful products in an environmental friendly way.

The presence of terpenes in "Py-oil" or rubber pyrolysis oil has been known for decades. However, the concentration is low. Attempts to separate the terpenes via distillation have been counterproductive because the heat required for distillation results in decomposition of the most valuable terpenes, such as limonene. Simply reducing the pressure of the distillation results in very high costs from large columns and long processing residence times. Also, there is great difficulty in separating odiferous mercaptans, and complications from sulfur content, water content and solids.

SUMMARY OF THE INVENTION

This section provides a general summary of the disclosure, and is not a comprehensive disclosure of its full scope or all of its features.

In accordance with the various embodiments of the present invention, this invention relates to a component mounting system for vacuum pyrolysis of scrap tires to produce pyrolytic oil containing such compounds as dl-limonene and pulogene which has a high price on the market.

The technology described here provides a combination of a concept totally new to the concept of extraction of value from oils derived from pyrolysis of scrap while preserving the valuable carbon black solids. This combination yields high concentrations of highly valued fragrance and essential oils that are known for their unique solvent properties, their usefulness as precursors for pharmaceuticals, odor masking capabilities and "green" character in ultimate disposal. The most obvious example of application of these steps is recovery of terpenes and terpenoids from pyrolysis of scrap tires. It achieves maximum value recovery from the oils, the solids (carbon black and metal) and the gas (light hydrocarbons).

The technology described here provides a combination of a concept totally new to the concept of extraction of value from oils derived from pyrolysis of scrap while preserving the valuable carbon black solids. This combination yields high concentrations of highly valued fragrance and essential oils that are known for their unique solvent properties, their usefulness as precursors for pharmaceuticals, odor masking capabilities and "green" character in ultimate disposal. The most obvious example of application of these steps is recovery of terpenes and terpenoids from pyrolysis of scrap tires. It achieves maximum value recovery from the oils, the solids (carbon black and metal) and the gas (light hydrocarbons).

Scrap rubber or similar materials are heated under vacuum and in the presence of a compound which, upon heating, decomposes into an active species which accelerates the de-vulcanization and decomposition of the polymers and elastomers in the scrap. As the temperature of the raw material-catalyst mixture rises further, valuable compounds are vaporized. The reactor is designed such that there are exhausts in the immediate region to carry away vapors, but by the point in the reactions, the catalyst has decomposed and the catalytic species is directly in contact with the melting materials. Therefore, the catalyst precursor cannot be carried away by escaping vapors.

DESCRIPTION OF THE DRAWINGS

In the accompanying drawings which form part of the specification.

Corresponding reference letters and numerals indicate corresponding steps or parts throughout the several figures of the drawings.

While one embodiment of the present invention is illustrated in the above referenced drawings and in the following description, it is understood that the embodiment shown is merely one example of a single preferred embodiment offered for the purpose of illustration only and that various changes in construction may be resorted to in the course of manufacture in order that the present invention may be utilized to the best advantage according to circumstances which may arise, without in any way departing from the spirit and intention of the present invention, which is to be limited only in accordance with the claims contained herein.

DETAILED DESCRIPTION OF A PREFERRED EMBODIMENT OF THE INVENTION

In the following description, numerous specific details are set forth such as examples of some preferred embodiments, specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill.

At least one preferred embodiment of the present invention is illustrated in the drawings and figures contained within this specification. More specifically, certain preferred embodiments of the present invention are generally disclosed and described in FIGS. 1, 2, and 3 for the pyrolysis of tires to obtain various pyrolytic oils from which valuable compounds may be extracted.

In that embodiment, two distillation columns are utilized; one at atmospheric pressure or slightly higher and the second at hard vacuum. Further, this process demonstrates the addition of a small volume of an oxidant that contains no new elements and adding it only to the final purification step. Mercaptans of the carbon-chain length found in the organic liquids downstream of rubber pyrolysis can be removed by addition of an oxidant, but the amount of oxidant required is quite high and the particular oxidants necessary are expensive. Also, one cannot introduce significant amounts of new materials without incurring other negative results, such as disposal costs or reduced value of remaining materials. That problem is easily handled here by adding small quantities of a specific oxidant to the small volume stream containing the terpenes and terpenoids.

General Process Theory.

A. Catalyst/Additive:

The addition of catalysts to rubber pyrolysis is optional. Some researchers claim no catalyst is necessary or even desirable for rubber pyrolysis; other researchers claim that whole groups of materials can give a catalytic effect. However, it is often the case that observed catalytic effects in laboratory bench-scale batch tests disappear when the technology is scaled-up to commercial size and operations are switched from "batch" to "continuous." The approach here results from the desire to produce the catalytic species in situ, i.e., to convert relatively inert materials to active species just as the temperature and reactant state are optimal to utilize the catalyst. The best catalyst to achieve this is a Group 1 element, such as Sodium or Potassium. The compounds most able to carry the Group 1 element into the high temperature zone are carbonates or bicarbonates. So, for scrap rubber containing raw materials, Potassium Carbonate is the best material to yield K+ ion directly in the mixture and in intimate contact with the polymeric and elastomeric materials in rubber.

B. Reactor Design.

Full-sized commercial processing units can be "batch" or "continuous." In either case, the reactor must be designed so that the additive which is the catalyst precursor must be present as the temperature reaches the point where the rubber melts, the additive decomposes to release the catalytic species and the organic vapors do not carry the precursor additive or valuable carbon black away. This is achieved differently in continuous and batch systems.

In a continuous system, the feed materials, e.g., scrap rubber and catalyst/additive are blended together and fed via a screw system. The temperature rises as the mass passes through the heated reactor. The exhausts for the vapors are located just beyond the point where the rubber melts and the additive decomposes to yield the catalyst.

In a batch system, the catalyst/additive is placed in a container above the rubber placed inside the reactor. As the temperature rises, the container is dumped and its contents dispersed over the rubber as it reaches the melting temperature.

In either batch or continuous systems, the additive is in contact with the melting rubber just as the additive decomposes and releases the catalytic Group 1 ion. But, this additive decomposition intimate contact occurs before escaping organic vapors can carry the additive material away.

C. Recovery/Purification.

Compounds which distill at very similar temperatures can also be separated by operating at different pressures. In this operation, two columns are used at two pressures, e.g., atmospheric pressure and so-called "hard" vacuum. The pressure in a column varies from high to low, proceeding up the column, the pressure variation being achieved by the additive pressure drops of the distillation trays and/or packing. A significant simplification and great improvement is achieved by utilizing the concept of a Joule-Thomson expansion between two columns. This provides a sharp change in pressure and the immediate condensation of a subset of the compounds present because of the temperature drop. Thus, a subset can be easily separated in a second, smaller operating at a greatly reduced pressure. Mercaptans of the carbon-chain length found in the organic liquids downstream of rubber pyrolysis can be removed by addition of an oxidant, but the amount of oxidant required is quite high and the particular oxidants necessary are expensive. One cannot introduce significant amounts of new materials without incurring other negative results, such as disposal costs or reduced value of remaining materials. That problem is easily handled here by adding small quantities of a specific oxidant, a Sodium or Potassium Percarbonate, to the small volume stream containing the terpenes and terpenoids. Sodium Percarbonate is the principal ingredient in an existing consumer product sold in large volume.

Many of the compounds produced by pyrolysis are unsaturated and, thus could be reactive during the distillation process. Additionally, the heavier, higher molecular weight compounds, could have an affinity for the compounds of interest, increasing their activity coefficients and raising their effective boiling points. In a complex mixture as noted herein, these effects cause separations to be broad causing overlap between fractions. To overcome this, additional plates are added to the system and the temperature profile is adjusted. The increased time at higher temperatures often encounters cracking and coking reactions.

In thin (or wiped) film evaporation, separation is achieved at 130° C., much lower than that required for bulk distillation. The use of a thin (or wiped) film process spreads the oil in a thin film over a heated surface, allowing the oil to heat quickly and evenly and breaking the interactions between the lighter and heavier compounds. This provides a sharper, more complete separation. By doing this lighter fraction, there is a clean cut between the heavy and light components without cracking and coking reactions. The light fraction is referred to as enhanced distillation feedstock since it contains a clean cut of the compounds of interest. The heavy fraction has a higher heat content than the starting pyrolysis oil and has an increased flash point, which better meets DOT regulations for shipping fuel.

After the thin film evaporator process, the lighter fraction from the wiped (or thin) film evaporation is fractionated by column distillation utilizing a multi-plate system containing 8 to 20 plates with refluxing at the upper most plate. This flash film process allows separation of value-added fractions such as terpenes, mercaptan/organo-sulfur, and alkylated monocyclic fractions, thus increasing the overall value of the pyrolysis oil.

CERTAIN PREFERRED EMBODIMENTS OF THE PRESENT INVENTION

Referring again to FIG. 1, one embodiment of the present invention is disclosed that provides a continuous reactor process B.

Figure 1:
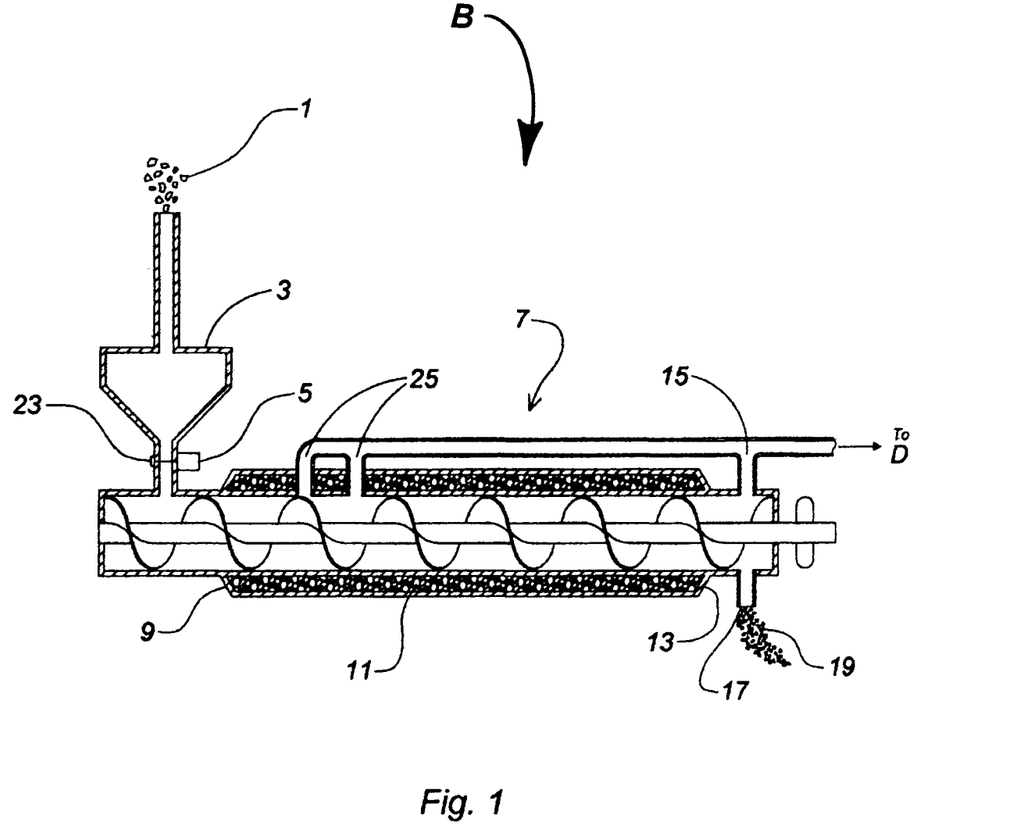
FIG. 1 shows a diagram of one embodiment of the present invention related to a continuous reactor process.

Shredded scrap material 1, such as automobile tires after being washed and dried, is fed into a nitrogen-blanketed bin 3. From nitrogen-blanketed bin 3 the shredded scrap material 1 flows through vacuum-lock valves 5 (also called "Double Dump" valves) and the additive/catalyst precursor 6 is added at fill point 23. The shredded scrap material 1 and the additive/catalyst enters a tubular reactor 7 which has a helical screw 9 which slowly turns at between about 0.3 and about 2.0 rpm. so that the mixture of the shredded material and the additive/catalyst precursor is conveyed through the tubular reactor which is heated electrically heating bands 11.

At a point approximately 15% of the length of the tubular reactor 7, the shredded material 1 reaches its melting point. Organic vapors 21 evolving from the melting shredded material 1 are drawn from the first exit port 25 on the tubular reactor 7. The temperature continues to increase until the shell temperature near the second vapor port 15 is approximately 450 degrees Centigrade. The shredded material 1 continues to decompose/de-vulcanize, and organic materials and residual moisture are drawn from the solids of the shredded material 1 as that shredded material proceeds toward the exit end 13 of the tubular reactor 7. Here, the remainder of the organic materials that have been drawn from the shredded material 1 are drawn away through second vapor port 15, while the solids 19 are removed at solids exit port 17. The solids 19, which are generally about 80+% carbon black by weight, proceed to other locations for further finishing and processing for sale. The organic vapors 21 enter a Contactor/Separator D where initial condensation occurs of the organic vapors, utilizing in certain embodiments, an oil spray of previous cooled liquid material. From this point in the process, the recovery process is the same for either a continuous system or a batch recovery system.

Figure 2:
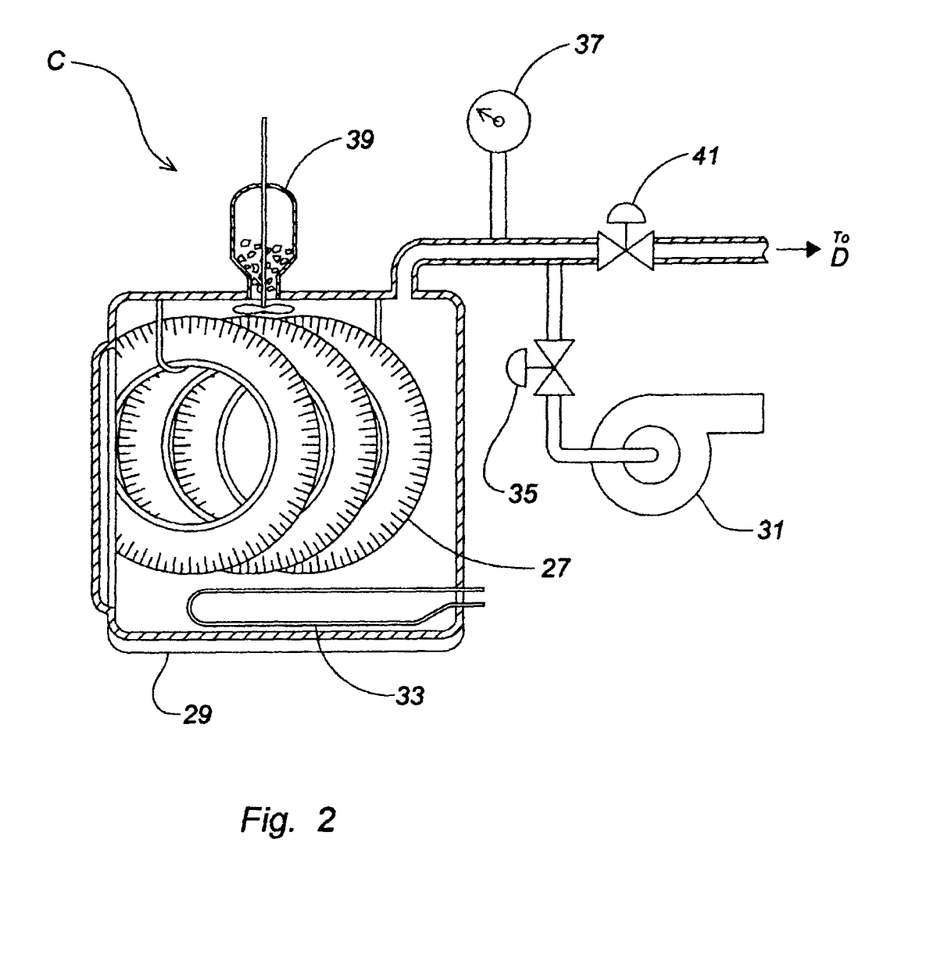
FIG. 2 shows a system diagram of one embodiment of the present invention related to a batch reactor process.

Referring to FIG. 2, an alternative embodiment of the present invention is disclosed that provides a batch reactor process C.

Whole tires, especially whole large, off-the-road and heavy equipment tires 27 are loaded into a large vacuum-sealed furnace 29. The vacuum sealed furnace 29 is evacuated using a vacuum pump 31. The heating of the sealed furnace 29 is initiated by operating a heating device 33. It is understood that the heating device 33 may be either an electric heater or a suitable gas burner. Once a suitable low pressure of about 0.1 atmosphere is achieved, a pressure valve 35 that is operatively connected to vacuum pump 31 is closed and a pressure gauge 37 is monitored to maintain the suitable low pressure needed for the process.

When the furnace temperature reaches 200 degrees Centigrade, an additive/catalyst located in a bin 39 is released and distributed over the whole tires 27 in the furnace 29. As the pressure reaches that of the downstream system, especially at a spray-tower 41 (FIGS. 3A and 3B), the release valve 40 (FIG. 2) is opened slowly. This allows the organic vapors 21 to flow to the Contactor/Separator D. The operation continues until no further organic vapors 21 flow toward the Contactor/Separator D, as would indicated by a decline shown on pressure gauge 37. At the completion of the batch operation, the heating device 33 is turned off, the valves 35 and 41 are closed and the furnace 29 is allowed to cool. Once cool, the remaining carbon black, ash, and metal wire are collected and removed from the furnace 29.

D. Recovery and Purification.

The general recovery of the valuable terpene material is accomplished by inserting the liquid oil that results form the above described batch or continuous operation processes. In the present embodiment, a Contactor/Separator System D (FIG. 3) is used for recovery and purification of the terpene materials. In that recovery and purification process, the liquid oil enters a first distillation column 51 where the liquid oil proceeds downward by gravity. The preferred internal components for the first distillation column 51 are filter trays 45. In smaller systems having an internal diameter of less than about 2 centimeters to about 3 centimeters, the filter trays 45 would be of Snyder-type, floating ball design. In larger columns having an internal diameter of about 20 centimeters to about 30 centimeters, the filter trays 45 would be bubble cap or "top hat" design in preference over sieve trays, however, sieve trays may still be used in the upper portion of the larger column. Whichever trays are employed, it is understood that the vapors in the first distillation column 51 rise and liquids fall by the operation of gravity. Heat is supplied to the first distillation column 51 by means of a re-boiler 43 that will normally be steam-heated in larger systems and heated by electricity in smaller systems. In an integrated plant, waste heat from unrelated sources may also be used to provide the necessary heat. Regardless of the heat source, however, the bottom 49 of first distillation tube column 51 will be approximately 200 degrees Centigrade.

Figure 3:
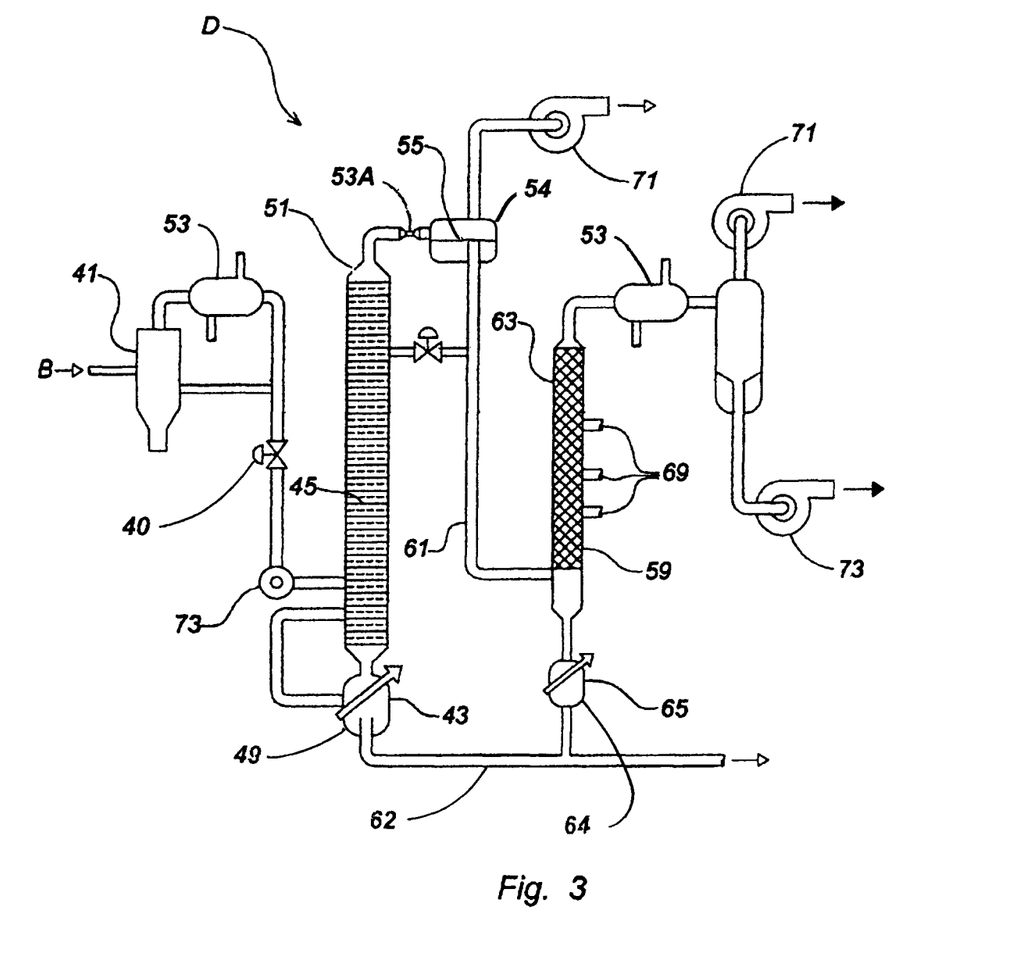
FIG. 3 shows a system diagram of one embodiment of the present invention related to a contactor/separator system.

The liquid material from the bottom 49 of the re-boiler 43 approximates the properties of crude oil which is taken for sale and constitutes roughly 55% by volume of the liquid oil fed to the first distillation column 51. The residual vapors rising within the first distillation column 51 are the lighter materials (shorter molecular chains or smaller molecular formula weight). The temperature near the top of the first distillation column 51 is approximately 185 degrees Centigrade at 760 mm Hg or 760 torr. Those residual vapors exit the top of the first distillation column 51 where the vapor pressure is relieved into a separator 54 through a small orifice 53A and the gases expand rapidly, whereby they cool due to the Joule-Thomson effect, i.e., the change of a gas or liquid when it is forced through a hole or multiporous plug while kept insulated (so that no heat is exchanged with the surroundings). Thus, the name "throttling process" or JouleThomson process. It is understood by those of skill in the art that the cooling of a condensable substance is rapid enough, the cooling causes some of the organic materials of the residual vapors to become a liquid oil 55. A chiller assembly 53 for reducing the temperature of the vapor is provided for each distillation column 51 and 59. That liquid is enriched in terpenes relative to the vapors. The vapor temperature should fall almost instantaneously, or within about one second.

The light liquid oil from the separator 53 enters the second distillation column 59 where the light liquid oil 55 partially flashes and the remaining liquid oil proceeds downward through a set of connective piping 61 by gravity. Preferred internal components 63 for the second distillation column 59 include sieve trays or structured packing. In smaller systems of between about 1 centimeter and about 2 centimeters, the internal components 63 can be trays and may be of the Snyder-type, floating ball design. Heat can be supplied to the column by means of a second re-boiler 65. In an integrated plant, waste heat may be used to provide the heat to the second distillation column 59 as long as the bottom 67 of the second distillation column will be approximately 100 degrees Centigrade to ensure minimal degradation of terpenes or terpenoids. The liquid material from the bottom of the second distillation column 59 approximates the properties of light crude oil. That light crude oil is then combined with the bottom 49 of first distillation column 45 and taken away for sale. Auxiliary vacuum pumps 71 and auxiliary liquid pump 73 are used to generally operate or evacuate the system.

It will be appreciated that several streams or taps 69 are taken from the second distillation column 59. Because the vapors rising within the second distillation column 59 are the lighter materials (shorter molecular chains or smaller molecular formula weight) the low boiling terpenes or terpenoids predominate in the upper internal components 63 of the second distillation column. It is generally noted that the top portion the second distillation column 59 is approximately 85 degrees Centigrade at 60 mm Hg or 60 torr.

Figure 3A:
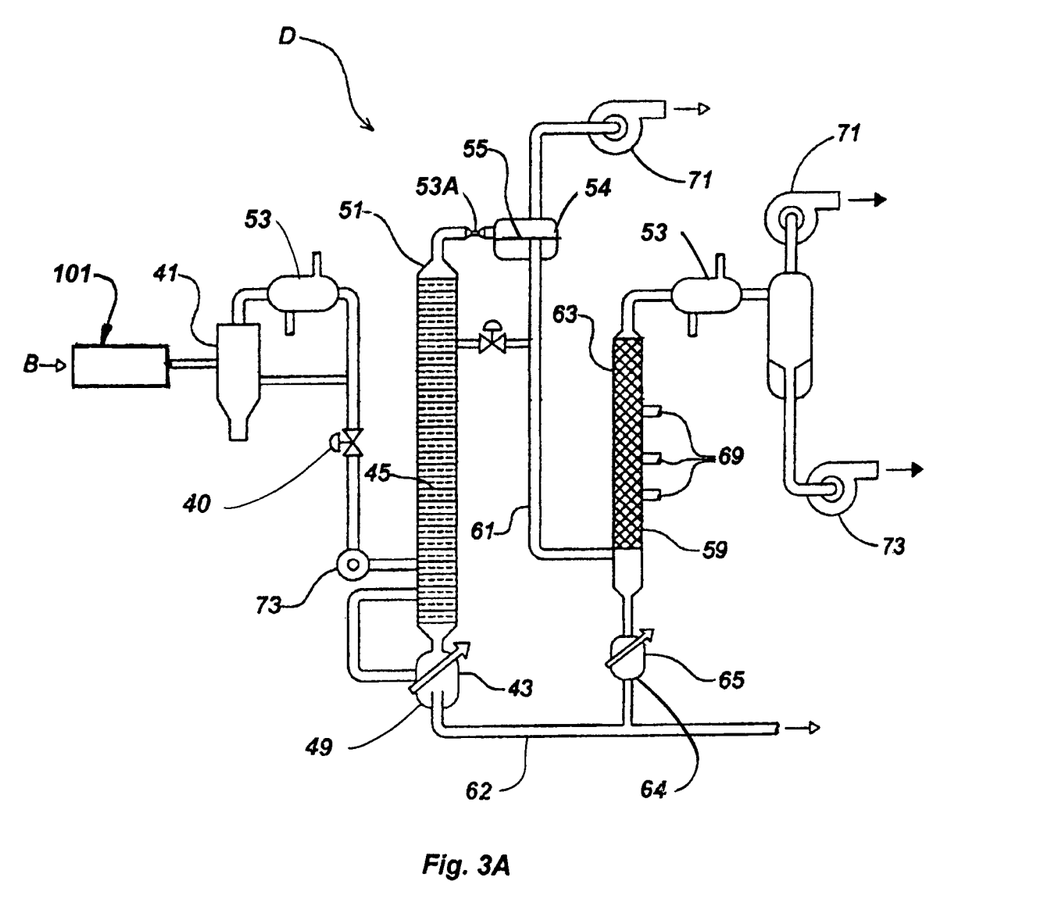
FIG. 3A shows a system diagram for an alternative embodiment of the present invention where a thin film evaporator is incorporated.

FIG. 3A shows an alternative embodiment that incorporates a flash film process in the general form of a thin film evaporator element 101. In this embodiment the system is generally the same as that shown in FIG. 3 with the exception that a thin film evaporator 101 is installed at the front end of the system ahead of the Contactor/Separator D.

Figure 3B:
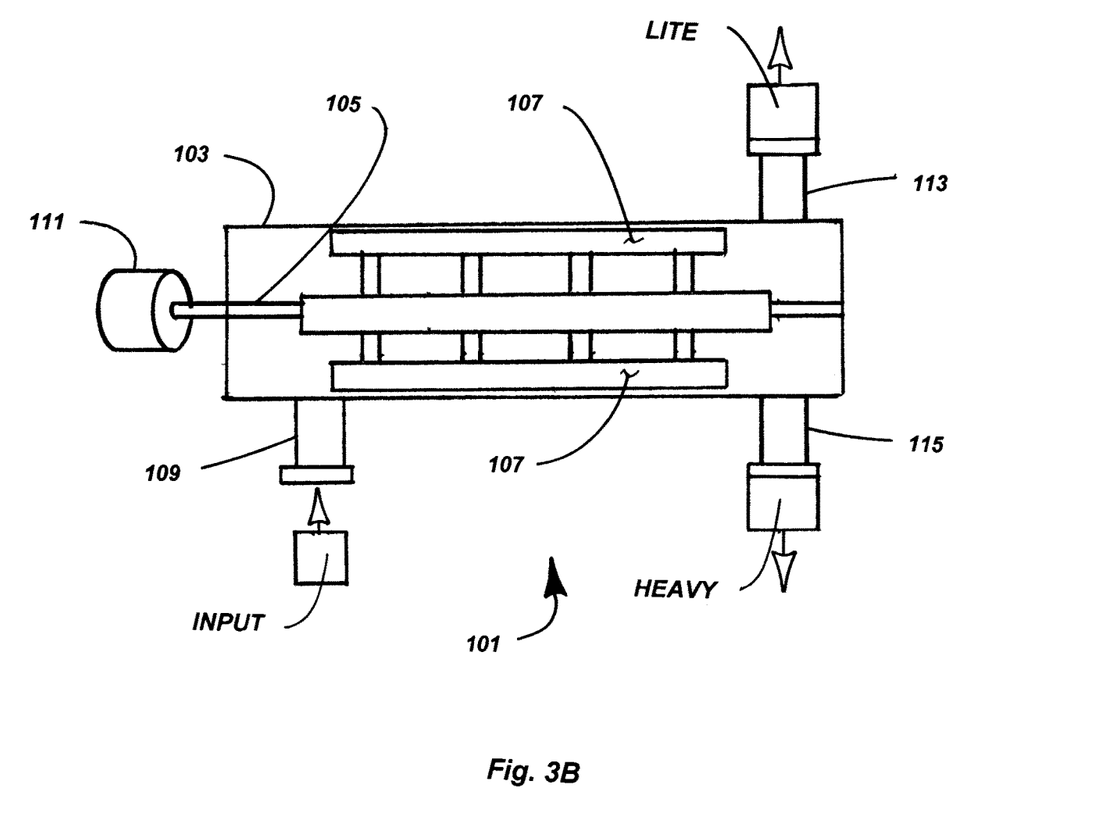
FIG. 3B shows a system diagram for an alternative embodiment of the present invention showing a version of the thin film evaporator.

FIG. 3B shows a cross section through one version of the thin film evaporator 101. The horizontal wiped film evaporator 101 includes a cylindrical tube 103 with a rotary shaft agitator 105 containing wipers 107. Pyrolysis oil is introduced through a feed inlet 109 and the agitator 105 is rotated by a drive 111 as to create a thin layer of oil (preferably 0.1 mm to 1 mm thick) on the surface of the cylindrical tube surface 103. The speed of the drive is set as to not create pooling channels along the reactor wall. The system is operated at 100 to 300 torr vacuum or more preferably 145-155 torr for the entirety of the run whilst maintaining a tube wall temperature of 125-145° C. or more preferably 130-140° C. Torr equals mm Hg. Two fractions, a light fraction and a heavy fraction, are generated with this process. The light fraction exits through the light (flash) outlet 113 and is the distillate fraction that is enriched in essential oils and highly volatile solvent chemicals that is an enhanced feedstock for further processing. The heavy fraction exits through the heavy bottoms outlet 115 and is a stable fuel like oil that is valuable as heating and engine fuel stock.

The product mixture from the distillation process in an alternative embodiment can be irradiated by a broad spectrum ultraviolet lamp 75 which is triggered by pulses of voltage increase. After exposures of two hours, four hours and seven hours to the UV light, significant changes in the relative concentrations of terpenes and other valuable materials takes place and the appearance of the product material darkens noticeably. Substantial cooling is required to remove excess heat from the irradiation chamber and an additional pump may be required. Coolant from a refrigeration system removes such excess heat which is carried away as a heating fluid to be used elsewhere in the process. Analysis by gas chromatography indicates that the concentration of some terpenes such as isopulegol has more than doubled while other materials such as toluene may decrease by 25% or more. This entire portion of the process may be located within the distillation process.

In the preceding description, numerous specific details are set forth such as examples of specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication and manufacture for those of ordinary skill. The scope of the invention should be determined by any appended claims and their legal equivalents, rather than by the examples given.

Additionally, it will be seen in the above disclosure that several of the intended purposes of the invention are achieved, and other advantageous and useful results are attained. As various changes could be made in the above constructions without departing from the scope of the invention, it is intended that all matter contained in the above descriptions or shown in the accompanying drawings shall be interpreted as illustrative and not in a limiting sense.

Terms such as "proximate," "distal," "upper," "lower," "inner," "outer," "inwardly," "outwardly," "exterior," "interior," and the like when used herein refer to positions of the respective elements as they are shown in the accompanying drawings, and the disclosure is not necessarily limited to such positions. Terms such as "first," "second," and other numerical terms when used herein do not imply a sequence or order unless clearly indicated by the context.

When introducing elements or features and the exemplary embodiments, the articles "a," "an," "the" and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It will also be understood that when an element is referred to as being "operatively connected," "connected," "coupled," "engaged," or "engageable" to and/or with another element, it can be directly connected, coupled, engaged, engageable to and/or with the other element or intervening elements may be present. In contrast, when an element is referred to as being "directly connected," "directly coupled," "directly engaged," or "directly engageable" to another element, there are no intervening elements present. Other words used to describe the relationship between elements should be interpreted in a like fashion (e.g., "between" versus "directly between," "adjacent" versus "directly adjacent," etc.).

What is claimed is:

1. A device for the pyrolysis of tires to form pyrolytic oils containing limonene and pulegone comprising;
   a nitrogen-blanketed bin operatively disposed above a vacuum-sealed furnace for accepting a quantity of washed and shredded material generally composed of dried automobile tires;
   a fill point for adding an additive/catalyst precursor;
   at least one vacuum-lock valve capable of controlling a release of the additive/catalyst precursor into the vacuum-sealed furnace;

the vacuum-sealed furnace including a tubular reactor having an exit end and a helical screw capable of rotating within the tubular reactor at between about 0.3 and about 2.0 rpm, and wherein the tubular reactor is substantially surrounded by at least one heating band capable of heating the tubular reactor to about 450 degrees Celsius at a first vapor exit port at the exit end of the tubular reactor;

a solids exit port for removal of a solid waste from the tubular reactor; a second vapor exit port on the tubular reactor for drawing an organic vapor from a midpoint of the tubular reactor for drawing vapors from the tubular reactor and into a contactor/separator, wherein the contactor/separator includes:

a spray tower, a chiller, and a release valve operatively disposed downstream of the first vapor exit port;

a first distillation column disposed downstream of the spray tower, the chiller, and the release valve, the first distillation column having at least one of either a plurality of Snyder-type, floating ball design filter trays, a plurality of filter trays having at least one of either a bubble cap or a top hat design, or filter trays having a sieve design, a re-boiler capable of heating a bottom of the first distillation column to about 200 degrees Centigrade;

a second distillation column for recovery of at least one of either a type of terpene or a type of terpenoid, wherein the second distillation column has a first piping system operatively connecting the first distillation column to the second distillation column such that a fluid may pass from the first distillation column to the second distillation column wherein the second distillation column includes at least one of either a plurality of Snyder-type, floating ball design filter trays or a plurality of filter trays having a sieve design, and a second re-boiler capable of operating at a temperature of about 100 degrees Centigrade, and a second piping system operatively connecting the bottom of the first re-boiler of the first distillation column to the bottom of the of the second re-boiler of the second distillation column; and a plurality of vapor taps mounted to the outside of the second distillation column.

2. The device for the pyrolysis of tires to form pyrolytic oils containing limonene and pulegone of claim 1, further comprising a thin film evaporator element operatively connected upstream of the first distillation column, wherein the thin film evaporator includes a cylindrical tube with a rotary shaft agitator containing a set of wipers, a feed inlet wherein the rotary shaft agitator is rotated by a drive to create a thin layer of oil having a thickness of between 0.1 mm and 1 mm on the surface of the cylindrical tube surface, alight vapor outlet, and a heavy bottoms outlet.

3. The device for the pyrolysis of tires to form pyrolytic oils containing limonene and pulegone in accordance with claim 1, wherein the contactor/separator can generate a pyrolytic vapor from the at least one of either the washed and shredded material or the vapor after a set of solids is removed from the washed and shredded material.

4. The device for the pyrolysis of tires to form pyrolytic oils containing limonene and pulegone in accordance with claim 3, wherein the first piping system transports a residual liquid and a residual vapor that are produced, transferred, recovered, and purified by the device for the pyrolysis of tires to form pyrolytic oils containing limonene and pulegone.

5. The device for the pyrolysis of tires to form pyrolytic oils containing limonene and pulegone in accordance with claim 4, wherein the additive/catalyst precursor is one of either a carbonate or a bicarbonate.

6. The device for the pyrolysis of tires to form pyrolytic oils containing limonene and pulegone in accordance with claim 5, wherein the one of either the carbonate or the bicarbonate contains one of either sodium or potassium.

7. The device for the pyrolysis of tires to form pyrolytic oils containing limonene and pulegone in accordance with claim 6, wherein the one of either the carbonate or the bicarbonate contains is-potassium carbonate.

8. The device for the pyrolysis of tires to form pyrolytic oils containing limonene and pulegone in accordance with claim 7, wherein the temperature of the washed and shredded material is about 450 degrees Centigrade at the second vapor port of the tubular reactor.

9. The device for the pyrolysis of tires to form pyrolytic oils containing limonene and pulegone in accordance with claim 8, wherein the device is a continuous system wherein the catalyst/additive precursor and the washed and shredded material are capable of being blended together in the vacuum-sealed furnace wherein the vacuum-sealed furnace includes the helical screw for moving the washed and shredded material through the vacuum-sealed furnace.

10. A device for the pyrolysis of tires to form pyrolytic oils containing limonene and pulegone comprising;

a nitrogen blanket vacuum sealed furnace for accepting automobile tires;

a heater for heating the nitrogen blanket vacuum sealed furnace of about 200 degrees Centigrade wherein the heater is disposed within the nitrogen blanket vacuum sealed furnace;

a vacuum pump for generating a vacuum in the nitrogen blanket vacuum sealed furnace, a pressure gauge for monitoring the vacuum generated by the vacuum pump, and a pressure valve;

an additive/catalyst bin placed within the nitrogen blanket vacuum sealed furnace for dispersion of an additive/catalyst over the automobile tires;

a first release valve for controlling the release of at least one of either a waste material and a vapor from a first vapor exit port of the nitrogen blanket vacuum sealed furnace into a contactor/separator to recover a pyrolytic vapor, wherein the contactor/separator includes:

a spray tower, a chiller, and a second release valve operatively disposed downstream of the first vapor exit port;

a first distillation column disposed downstream of the spray tower, the chiller, and the second release valve, the first distillation column having at least one of either a plurality of Snyder-type, floating ball design filter trays, a plurality of filter trays having at least one of either a bubble cap or a top hat design, or filter trays having a sieve design, a re-boiler capable of heating a bottom of the first distillation column to about 200 degrees Centigrade;

a second distillation column for recovery of at least one of either a type of terpene or a type of terpenoid, wherein the second distillation column has a first piping system operatively connecting the first distillation column to the second distillation column such that a fluid may pass from the first distillation column to the second distillation column wherein the second distillation column includes at least one of either a plurality of Snyder-type, floating ball design filter trays or a plurality of filter trays having a sieve design, and a second re-boiler capable of operating at a temperature of about 100 degrees Centigrade, and a second piping system operatively connecting the bottom of the first re-boiler of the first distillation column to the bottom of the of the second re-boiler of the second distillation column; and a plurality of vapor taps mounted to the outside of the second distillation column.

11. The device for the pyrolysis of tires to form pyrolytic oils containing limonene and pulegone of claim 10, further comprising a thin film evaporator element operatively connected to the first distillation column, wherein the thin film evaporator includes a cylindrical tube with a rotary shaft agitator containing a set of wipers, a feed inlet wherein the rotary shaft agitator is rotated by a drive to create a thin layer of oil having a thickness of between 0.1 mm and 1 mm on the surface of the cylindrical tube surface, alight vapor outlet, and a heavy bottoms outlet.

\* \* \* \* \*